United States Patent

Summer

[15] 3,674,124

[45] July 4, 1972

[54] FAIL-SAFE INFLATABLE SLIDE

[72] Inventor: James R. Summer, Brielle, N.J.

[73] Assignee: The Garrett Corporation, Los Angeles, Calif.

[22] Filed: Aug. 21, 1970

[21] Appl. No.: 65,914

[52] U.S. Cl. ........................................193/25 B, 244/137 P
[51] Int. Cl. .......................................................B64d 25/14
[58] Field of Search..................193/25 B; 152/342; 182/20; 244/137 P

[56] References Cited

UNITED STATES PATENTS

| 2,200,916 | 5/1940 | Crowley | 152/342 |
| 2,241,593 | 5/1941 | Gramelspacher | 152/342 |
| 3,463,287 | 8/1969 | Smith | 193/25 B |

*Primary Examiner*—Evon C. Blunk
*Assistant Examiner*—Johnny D. Cherry
*Attorney*—Orville R. Seidner and John N. Hazelwood

[57] ABSTRACT

An inflatable slide member has a redundant wall. The inner wall defines a restricted passageway, or passageways, communicating from one surface of the inner wall to the other surface. Upon loss of pressure-holding-integrity of the outer wall, as by a puncture, the inner wall provides backup integrity to maintain sufficient pressure for a necessary length of time to which the slide is put to use.

11 Claims, 8 Drawing Figures

PATENTED JUL 4 1972 3,674,124
SHEET 1 OF 2
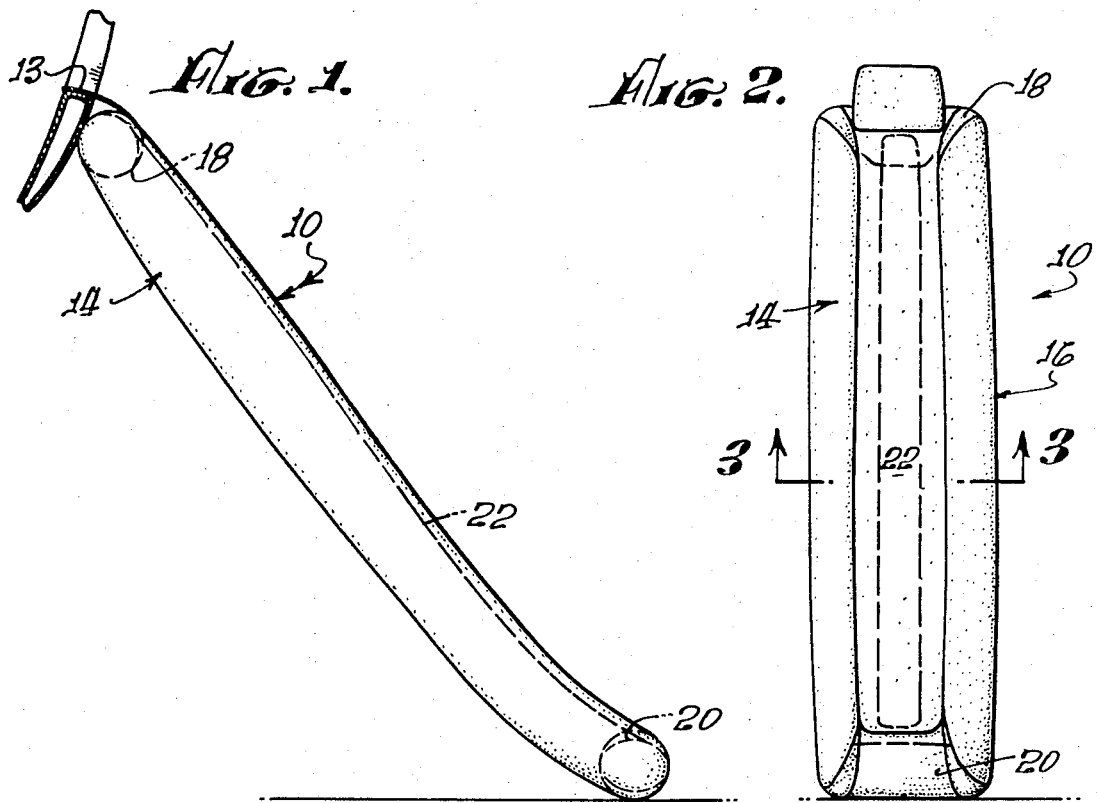
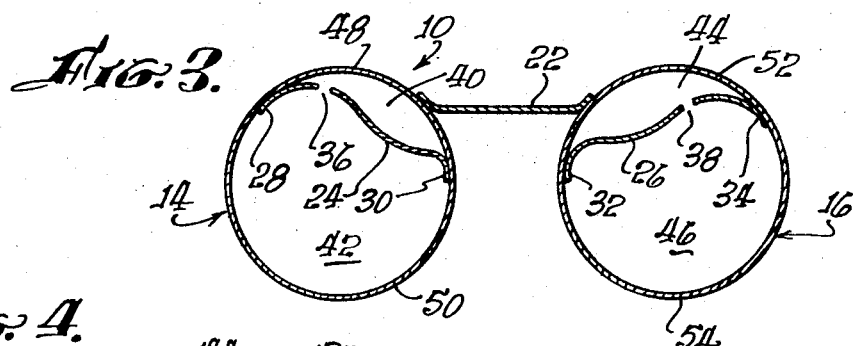
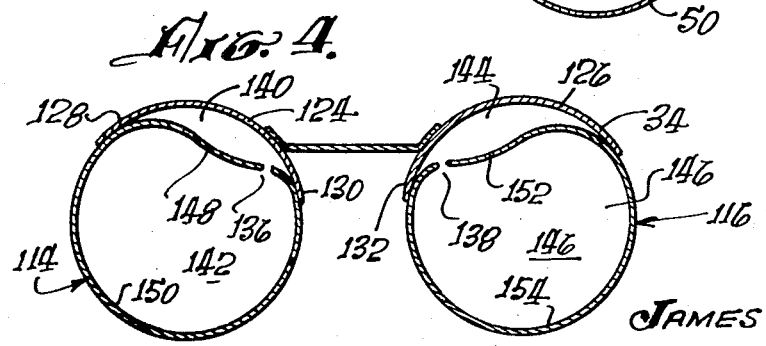
INVENTOR.
JAMES R. SUMMER,
By Orville R. Beidney
AGENT.

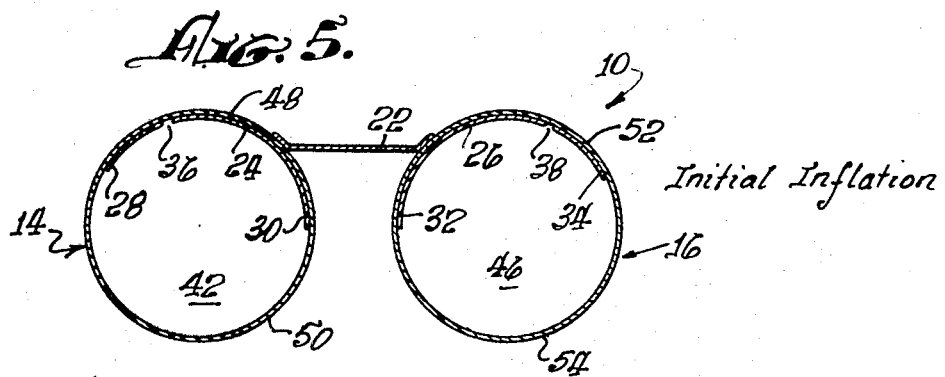
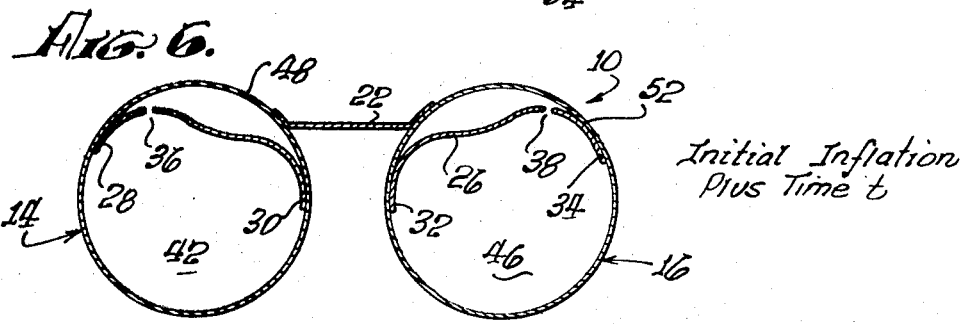
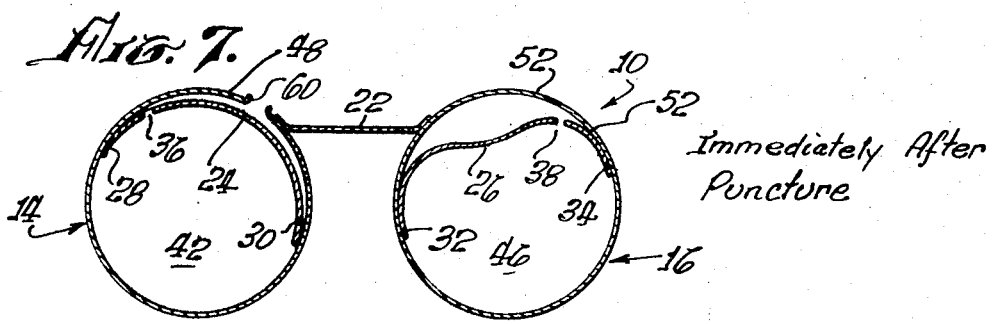
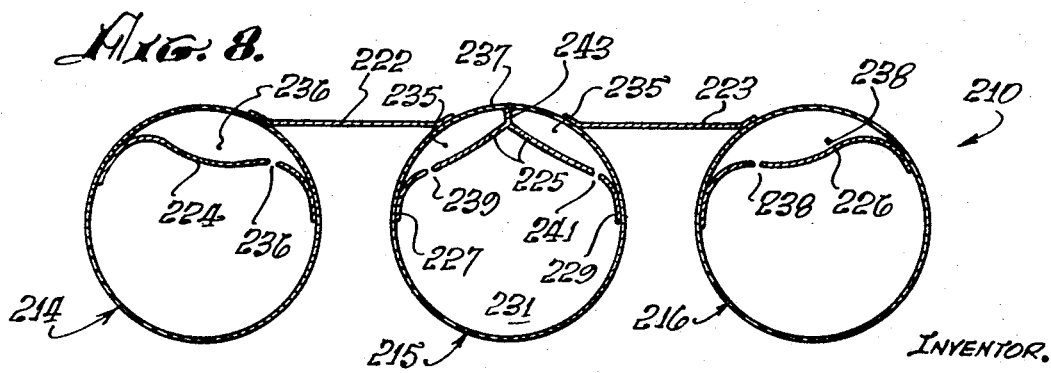

FAIL-SAFE INFLATABLE SLIDE

BACKGROUND OF THE INVENTION

This invention relates generally to the art of inflatable apparatus and is more particularly concerned with a flexible-walled, fluid-distensible, generally-tubular member of such apparatus. The invention has most particular application and utility for inflatable escape slide apparatus employed with aircraft, for example, to effect rapid escape of passengers therefrom in the event of an emergency at ground level.

Apparatus of this type is usually comprised of one or more inflatable tubular members arranged to extend outwardly and downwardly from an aircraft egress upon inflation of the members, the lower end of the member or members thereupon coming to rest on the runway or ground. The members afford a fluid-stressed beam arrangement adapted to support the weight of one or more persons exiting from the aircraft onto the slide.

However, since the fluid pressurized members are comprised of a generally impermeable fabric it has been discovered that upon occasion the fluid pressure integrity of the members, or one of them, is imperiled by an accidental rupture of the fabric as the result of a small puncture or slash through the upper surface of the member. The danger is not so much from the small puncture since the inflated member has a relatively large pressurized volume serving as a source of fluid escaping from the puncture. Hence the member would ordinarily maintain a reasonable fluid-stressed beam configuration for the short time during which the slide is in use. Rather the danger is in the nature of the fabric of the member in that a small slash, for example, tends by reason of the pressure differential thereacross to propagate as a tear rapidly from the point of puncture and the member loses load-sustaining pressure almost at once. On occasion, debarking passengers on the slide have been precipitately dropped to the airfield runway, and have been injured.

SUMMARY OF THE INVENTION

The present invention overcomes the limitations of the inflatable slides of the prior art by providing the inflatable members with a fail-safe redundant wall arrangement in which an auxiliary backup or standby membrane element, interiorly disposed and relaxed within the pressurized member assumes the fluid stressed state upon puncture damage to the main membrane element. Preferably the edge of the auxiliary membrane is secured with a fluid seal to the main membrane, with a fluid flow means providing fluid communication between the interior of the tubular member and the chamber formed by the two membranes. The flow means serves the purpose of permitting relaxation of the auxiliary membrane during its standby function whereby the instrument or artifact causing the puncture of the main membrane does not likewise puncture the redundant auxiliary membrane.

In one embodiment, the redundant or auxiliary membrane is disposed within the tubular membrane with the edges of the auxiliary membrane cemented and/or sewn to the inner surface of the fabric of which the tubular member is comprised. The auxiliary membrane is punched with holes whose size and spacing may vary according to the application. In a typical embodiment the holes might be sized about 1/16-inch diameter, on centers of about 2 feet, to form restricted fluid flow passageway means between the interior of the tubular member and the chamber formed between the auxiliary membrane and the adjacent inner surface of the member.

In another embodiment, the redundant membrane is disposed exteriorly of the tubular member with the membrane edges secured to the fabric of the member. In this case the membrane forms a chamber with a portion of the wall of the member, and restricted flow passageway means between the interior of the tubular member and the chamber are defined by similarly formed holes in the said wall portion of the tubular member, and which wall portion performs as the standby element in this version.

In both of the aforesaid embodiments it is preferred to inflate the tubular member by the admission of pressurizing fluid to the interior of the member, some of the fluid thereupon bleeding slowly through the restricted passageways into the chamber space, whereupon the auxiliary membrane in the case of the first-mentioned embodiment, or the said wall portion in the case of the second-mentioned embodiment, relaxes and gravitates away from the pressurized wall, Thus, the auxiliary membrane, or the said wall portion as the case may be, is not liable to simultaneous puncture with the adjacent wall, and is immediately available to assume the fluid-retaining pressurized-wall function previously performed by the now-punctured wall.

In both said embodiments it is seen that in the event of such a puncture, pressurized fluid may escape gradually through the restricted passageways. This is of not too great a concern in the case of an emergency escape slide for an aircraft since the complete evacuation of passengers from even the largest of the aircraft is effected in the matter of 90 seconds at the most.

In yet another embodiment of the invention, which could take the general form and structural relationship of either of the aforesaid embodiments, the pressurizing fluid would be primarily admitted to the chamber space between the standby wall element and the adjacent wall. In this case the small restricted passageways would be replaced by a single fairly large passageway having a flapper check valve arrangement adapted to permit flow of pressurizing fluid therethrough from the chamber space into the larger volume of space defined by the tubular member, but to prevent reverse flow therefrom back into the chamber space. Such an arrangement would prevent any unwanted leakage of fluid from the tubular member in the event of a puncture of its upper surface.

BRIEF DESCRIPTION OF THE DRAWINGS

FIG. 1 is a side elevation view of a slide embodying the invention;

FIG. 2 is a front elevation view of the slide of FIG. 1;

FIG. 3 is an enlarged view in cross-section, somewhat schematic in form, of one embodiment of the invention taken on the line 3—3 of FIG. 2;

FIG. 4 is a view similar to FIG. 3 of another embodiment;

FIG. 5 is a cross-section view, similar to FIG. 3, illustrating the disposition of the wall elements during an initial inflation stage;

FIG. 6 is a view illustrating the disposition of the wall elements of the apparatus of FIG. 5 a brief interval of time after inflation has been substantially completed;

FIG. 7 is a view illustrating the disposition of the wall elements of the apparatus of FIG. 6 upon the occasion of a tear or puncture; and FIG. 8 is a cross-section view, similar to FIG. 3, showing another embodiment of the invention.

DESCRIPTION OF THE PREFERRED EMBODIMENTS

Referring to FIG. 1, an escape slide 10 is shown inflated and deployed from the skin 12 adjacent an egress for passengers in the fuselage of an aircraft (not otherwise shown). Details of the attachment of the upper end of the slide 10 to the aircraft, and means for inflation and deployment of the slide, are well known and need not be further disclosed herein. As disclosed in FIG. 1 and 2, the slide 10 is comprised of a pair of elongate flexible-walled, fluid-distensible, generally-tubular beam members 14 and 16 joined at their upper and lower ends by similar short members 18 and 20, respectively, to form a generally rectangular fluid-stressed frame for a slide fabric 22, as best seen in FIG. 3. The side and end edges of the slide fabric 22 may be cemented or secured by sewing to the fabric of the beam members 14, 16 and 18, 20, respectively, by means well known in the art.

Referring to FIG. 3, the tubular beam members 14 and 16 are shown schematically as comprising internal auxiliary membranes 24 and 26 whose peripheral edges 28, 30, 32 and 34 are secured in fluid flow sealing relationship, as by cementing, for example, to the inner face surfaces of the respective beam members 14 and 16. The membranes 24 and 26 define fluid flow passageways 36 and 38, respectively, which provide fluid communication between chambers 40 and 42, defined by the membrane 24 and the beam member 14, and between chambers 44 and 46, defined by the membrane 26 and the beam member 16. Thus, pressurizing air, for example, usually admitted to the slide 10 for inflation and deployment is usually communicated firstly into the chambers 42 and 46, whereafter the air passes through the passageways 36 and 38 into the chambers 40 and 44, as explained hereinafter.

In FIG. 3, the chamber 40 is bounded by the interiorly disposed membrane 24 and a membrane element or wall portion 48 of the beam member 14, and the chamber 42 is bounded by the membrane 24 and the wall portion or element 50. Chambers 44 and 46 are similarly bounded by the membrane 26 and the respective elements or wall portions 52 and 54 of the beam member 16.

It will be appreciated that the redundant or auxiliary membranes 24 and 26 extend along the longitudinal axis of the beam members 14 and 16 for an appreciable distance thereof, which distance is preferably substantially the full length of the membranes so as to be operative throughout that length and thereby provide the greatest degree of effectivity of the safeguard feature of the invention. On the other hand, the auxiliary membranes have some mass which adds weight to the usual prior art slides, and from that standpoint it might be appropriate in particular cases of aircraft usage to confine the lengthwise span of the membranes to somewhat less than the full length of the beam members in order to minimize the dead weight of the escape slide.

By trial or by experience, for example, it might be found that a large preponderance of punctures occur within a particular portion of the lengthwise span, and that practically no incidence of punctures obtain in another clearly defined portion. In such a case, weight could be saved by reducing the lengthwise span of the auxiliary membranes and confining their attachment of those portions of the beams which are particularly subject to punctures.

FIG. 4 illustrates a configuration that is similar to that of FIG. 3 with the difference being that the auxiliary membranes are exteriorly disposed. Referring to FIG. 4, the tubular members 114 and 116 are comprised of auxiliary membranes 124 and 126 whose peripheral edges 128, 130, 132 and 134 are secured in fluid flow sealing relationship to the outer face surfaces of the respective beam members 114 and 116. The membranes and members thus define chambers 140, 142, 144 and 146. Chamber 140 is bounded by the membrane 124 and the membrane element or wall portion 148 of beam member 114, and chamber 142 is bounded by the elements or wall portions 148 and 150. In similar fashion the chambers 144 and 146 are bounded by the membrane 126 and the respective elements or wall portions 152 and 154 of the beam member 116. The wall portions 148 and 152, respectively, define fluid flow passageways 136 and 138 which provide fluid communication between chamber 140 and 142 and between chambers 144 and 146, respectively.

The operation of the invention may be seen by referring to FIG. 5, 6 and 7 which are referred back to FIG. 3 for reference numeral identification of the parts. As will be appreciated, inflatable escape slide apparatus for aircraft, such as the slide 10 of FIG. 1, is stored in compact folded condition in a container or storage bay adjacent the escape egress such as the egress 13 of FIG 1. Upon the advent of an emergency in the aircraft requiring rapid debarking of passengers via the slide, the door at the egress is opened and deployment of the slide begun by way of inflation of the fluid distensible members from a pressurized gaseous fluid source. Inflation and deployment proceeds rapidly, the elapsed time from initiation to pressurization of the tubular elements to about 3 psia, for example, being of the order of about 10 seconds or less in a typical case.

The first main portion of this time lapse is consumed principally for the filling phase up to an internal pressure slightly above that of ambient.

FIG. 5 illustrates this first phase of the filling of members 14 and 16, and it will be seen that the auxiliary membranes 24 and 26 are urged outwardly of the filling chambers 42 and 46 by the inflowing gaseous fluid so as to be adjacent the membrane elements or portions 48 and 52 of the respective members 14 and 16.

As the differential of pressure in chambers 42 and 46 above ambient begins to build up, the membranes 24 and 26 tend to gravitate downwardly, and gaseous fluid flows through the passageways 36 and 38 until the membranes float away from the elements or portions 48 and 52. Thus, fluid flows from the chambers 42 and 46 through the passageways 36 and 38 to form the respective chambers 40 and 44 above the membranes 24 and 26, substantially as seen in FIGS. 3 and 6. Thus, by the time the slide is fully inflated and ready to bear the weight of sliding passengers, the redundant walls or auxiliary membranes, represented by the membranes 24 and 26 of FIGS. 3 and 6 and the membrane elements or wall portions 148 and 152 of the embodiment of FIG. 4, have been displaced from the adjacent beam member wall portions a small distance such that there is only a very remote chance of puncture of the auxiliary membranes by an instrument or artifact which punctures any of the elements or membranes 48, 52, 124 or 126.

FIG. 7 illustrates the functional aspect of the invention upon the advent of a break in the integrity of the apparatus by tear or puncture of one of the beam members. As shown, a puncture of the upper surface portion 48 of the beam member 14 is indicated by the reference numeral 60.

Previous experience with such a puncture or tear in the pressurized beam members has been that the air escapes rapidly, and in so doing causes the fabric to rupture still more and propagate the tear for an extensive length. Thus the danger of the escape and loss of beam air is compounded, the beam deflates rapidly and is useless for its intended purpose in a matter of a second or two. Furthermore, such extensive tearing of the slide member is difficult, if not impossible, to repair for subsequent use. However, as can be seen in FIG. 7, the present invention reduces the perilous deflation and subsequent repair problems to a negligible factor.

In FIG. 7 it is seen, for example, that upon advent of the puncture 60 the air escapes only from that portion of the beam formerly defined as the chamber 40. This is only a nominal fraction of the total air in the beam 14, and as this relatively small amount of air escapes, the redundant membrane 24 is urged outwardly by the pressurized air in the chamber 42 until it assumes the primary pressurized stressed wall function. It is apparent, of course, that the expansion of the volume of chamber 42 in this instance also results in a lowering of the air pressure therein by a nominal amount, usually from about 3 psia to about 1½ or 2 psia which is insufficient to defeat the fluid stressed truss function of the beam 14.

It is also apparent there will be some tendency for the air in chamber 42 to escape through the fluid flow passageway 36 to ambient atmosphere. At its worst, the loss of air through such a passageway is very slow because of the restricted size of the passageway, and as a consequence the beam 14 retains most of its functionally essential pressure until the slide apparatus has served the then present emergency necessity. Thus, by the time the beam 14 has lost enough pressure as to cause it to collapse under the weight of sliding persons, the escape of all such persons from the aircraft will have been effectively and safely concluded.

However, it will be noted that the redundant membrane 24 is urged and pressed against the beam membrane wall portion 48 by the internal air pressure, and to some extent there is thus a further occluding by the wall 48 of the outlet of the passageway 36 and a corresponding decrease of the escaping air flow therethrough.

The embodiment of the invention, according to the foregoing description, is concerned with those cases where the arcuate span of the attached edges of the auxiliary membranes to the internal walls of the beam members 14 and 16 is somewhat limited, for example, less than 180°. This limited arcuate span, and consequent limited span of the auxiliary membrane, is desirable in order to obtain a favorable ratio of volume of chamber 42 over chamber 40, for example, in order that the expansion of chamber 42 from the amount schematically illustrated in FIG. 6 to that of FIG. 7 is not so great as to result in undesirable lessening of the pressure therein.

In those cases where a greater arcuate span is desirable or necessary, the embodiment of FIG. 8 may be employed. In this embodiment, the slide 210 comprises tubular beam members 214 and 216 flanking a middle beam member 215 having slide fabrics 222 and 223 arranged therewith to provide side-by-side slide surfaces. Members 214 and 216 are provided with internal auxiliary membranes 224 and 226 after the fashion described hereinabove. Member 215 is provided with an auxiliary membrane 225 which provides a greater span than the membranes 224 and 226, since the upper surface span of the middle member 215 which is subject to possible puncture is greater than that of either of the members 214 and 216.

Membrane 225 has edges 227 and 229 secured to he interior surface of the beam member 215 in fluid flow sealing fashion so as to define a lower chamber 231 between the lower portion 233 of member 215 and the membrane 225, and an upper chamber 235 between the membrane 225 and the upper portion 237 of member 215. Preferably, the span of the membrane 225 in both longitudinal and transverse directions is approximately equal to that of the upper beam portion 237 so that the area of the upper face of the membrane 225 is approximately equal to area of interior face of the beam portion 237 bounded by the edges 227 and 229 of the membrane 225.

The interior membranes 224, 225 and 226 are provided with periodically spaced restricted passageways to provide communication from side to side of said membranes. Illustrative passageways 236 and 238 are defined by respective membranes 224 and 226, and membrane 225 is shown with exemplary passageways 239 and 241 which provide communication between the chambers 231 and 235.

It is apparent from inspection that by reason of the passageways 239 and 241 the membrane 225 would gravitate downwardly by its own weight until the volume of chamber 235 became relatively large with a concurrent lessening of the volume of chamber 231, to the point where a puncture in the wall of the beam portion 237 would result in too great a loss of pressurized air. To prevent such as eventuality there is provided a plurality of hanger members, such as the hanger 243 which is just long enough to support the membrane in position that a puncturing instrument entering the beam portion 237 is not apt to also puncture the membrane 225. The hangers, of which hanger 243 is illustrative, are spaced periodically along the longitudinal axis of the beam member 215 at intervals such that the membrane 225 is adequately supported throughout its length.

In a typical beam member of a length of about 24 feet and having a nominal inflated diameter of about 22 inches, for example, and provided with a membrane corresponding to the membrane 225 extending for an axial distance of about 22 feet within the beam, the hangers such as that illustrated at 243 would be spaced preferably at about 1 to 1½ foot intervals. Thus there would be about 16 hangers, although the spacing between them might be less or greater as dictated by preference or need in a particular case. On the other hand, a continuous hanger could be utilized if desired. An essential factor dictating the spacing, and consequently the number of hangers in any particular case, is the utility of maintaining the volume of chamber 235 at a minimum and yet providing maximum spacing of the membrane 225 from the upper beam portion 237.

I claim:

1. Inflatable escape slide apparatus comprising:

a. an elongated flexible-walled, fluid-distensible structural tress member having an external wall of a generally flaccid and non-stretchable structural material, said truss member having a predetermined cross-sectional shape formed by said wall material when inflated;
   b. connection means adjacent one end of said truss member for attaching said slide apparatus to an elevated structure, said truss member at least partially providing a slide surface on the upper side of said external wall when said member is inflated and said one end is attached to an elevated structure;
   c. a generally impervious membrane element disposed in the interior of said truss member and extending longitudinally thereof, said membrane element being generally flaccid and non-stretchable and extending between locations on said wall material spaced apart from each other around the periphery of the wall;
   d. sail means joining said membrane element and said wall together at said locations to divide the interior of said truss member into a variable volume auxiliary chamber contiguous with said slide surface portion and a main chamber spaced from said slide surface portion, the span of said membrane element and the portion of said wall between said spaced locations being substantially equal, the volume of the auxiliary chamber being less than the volume of the main chamber;
   e. port means providing fluid communication between said auxiliary chamber and said main chamber, whereby upon puncture of said wall adjacent said membrane element air escapes from said auxiliary chamber and said membrane element expands outwardly to maintain the predetermined cross-sectional shape of said truss member.

2. The apparatus of claim 1 in which said membrane element is integral with said wall material, and the portion of said wall spanning said locations is joined to said membrane element.

3. The apparatus of claim 1 in which said membrane element is joined to the interior of said wall along said locations.

4. The apparatus of claim 1 in which said port means provides communication through said membrane element.

5. The apparatus of claim 1 wherein said membrane element spans less than one-half the periphery of said wall.

6. The apparatus of claim 1 in which said port means is comprised of a restricted passageway providing restricted fluid communication between said auxiliary chamber and said main chamber.

7. The member of claim 1 further comprising hanger means disposed between said inner face of said member and said membrane element to limit the gravitation movement of said element from said inner face of said member upon inflation thereof.

8. Slide apparatus comprising a. a generally tubular inflatable member
   b. connection means adjacent one end of said tubular member for attaching said member to an elevated structure, said member at least partially providing a slide surface when inflated;
   c. said member including inner and outer membrane elements, said outer membrane element forming the wall of said tubular member said slide surface extending longitudinally on the exterior of said outer member element;
   said inner membrane element, said inner membrane element being formed of substantially flaccid and non-stretchable structural fabric material, and being disposed within said outer membrane element;
   d. seal means joining said inner and outer membrane elements together at joints extending longitudinally of said outer membrane element and spaced apart from each other transversely of said tubular member, said inner membrane dividing the interior of said tubular member into an auxiliary fluid chamber contiguous with said slide surface portion and a main fluid chamber spaced from said slide surface portion and having a fluid flow passageway communicating between said auxiliary chamber and said main chamber, and the span of said inner membrane element between said joints being substantially equal to the span of said outer membrane element between said joints, whereby in the event of puncture of said outer element along said slide surface, said inner element expands to sustain said slide surface and, said inner membrane element being adapted to withstand structural truss stresses present in said member upon inflation of said apparatus.

9. The apparatus of claim 8 in which said fluid flow passageway is defined by a restricted communication passageway through said fabric material.

10. The apparatus of claim 9 in which said tubular inflatable member is formed of a substantially flaccid non-self-supporting fabric material to include said outer membrane element as a portion thereof.

11. The apparatus of claim 9 in which said tubular inflatable member is formed of a substantially flaccid non-self-supporting fabric material to include said inner membrane element as a portion thereof.

* * * * *

UNITED STATES PATENT OFFICE
CERTIFICATE OF CORRECTION

Patent No. 3,674,124  Dated July 4, 1972

Inventor(s) James R. Summer

It is certified that error appears in the above-identified patent and that said Letters Patent are hereby corrected as shown below:

Column 6, line 2, "tress" should read -- truss --; line 18, "sail" should read -- seal --; line 53, after "comprising" insert a colon(:).

Signed and sealed this 27th day of February 1973.

(SEAL)
Attest:

EDWARD M. FLETCHER, JR.
Attesting Officer

ROBERT GOTTSCHALK
Commissioner of Patents